United States Patent
Nishimine et al.

(10) Patent No.: US 11,603,470 B2
(45) Date of Patent: Mar. 14, 2023

(54) METHOD FOR MANUFACTURING GRANULATED SILICA

(71) Applicant: SHIN-ETSU CHEMICAL CO., LTD., Tokyo (JP)

(72) Inventors: Masanobu Nishimine, Takasaki (JP); Tomoya Ogata, Annaka (JP); Daichi Todoroki, Takasaki (JP); Tsutomu Nakamura, Annaka (JP); Susumu Ueno, Annaka (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 209 days.

(21) Appl. No.: 16/906,295

(22) Filed: Jun. 19, 2020

(65) Prior Publication Data

US 2020/0317928 A1 Oct. 8, 2020

Related U.S. Application Data

(62) Division of application No. 16/033,539, filed on Jul. 12, 2018, now abandoned.

(30) Foreign Application Priority Data

Aug. 1, 2017 (JP) .............................. JP2017-149469

(51) Int. Cl.
| | | |
|---|---|---|
| *B01J 2/00* | (2006.01) | |
| *C09C 3/12* | (2006.01) | |
| *C09C 3/04* | (2006.01) | |
| *C09C 1/30* | (2006.01) | |
| *C08K 9/06* | (2006.01) | |
| *C01B 33/18* | (2006.01) | |
| *B01J 2/30* | (2006.01) | |

(52) U.S. Cl.
CPC .................. *C09C 3/12* (2013.01); *B01J 2/30* (2013.01); *C01B 33/18* (2013.01); *C08K 9/06* (2013.01); *C09C 1/309* (2013.01); *C09C 1/3036* (2013.01); *C09C 1/3081* (2013.01); *C09C 3/045* (2013.01); *C01P 2004/64* (2013.01); *C01P 2006/10* (2013.01); *C01P 2006/60* (2013.01)

(58) Field of Classification Search
CPC .. B01J 2/00; B01J 2/30; C09C 1/3036; C09C 1/3081; Y10T 428/2995
See application file for complete search history.

(56) References Cited

U.S. PATENT DOCUMENTS

| | | | | |
|---|---|---|---|---|
| 4,274,883 A | * | 6/1981 | Lumbeck ................. | C08K 3/36 106/490 |
| 5,776,240 A | * | 7/1998 | Deller .................... | C09C 1/3036 106/490 |
| 2003/0103890 A1 | * | 6/2003 | Konya ................... | B82Y 30/00 423/335 |
| 2003/0162881 A1 | * | 8/2003 | Panz ..................... | C09C 1/3081 423/339 |
| 2007/0003701 A1 | * | 1/2007 | Yoshitake ............. | C01B 33/149 528/38 |
| 2011/0177446 A1 | | 7/2011 | Kaneeda et al. | |
| 2013/0131357 A1 | | 5/2013 | Liu et al. | |
| 2015/0355387 A1 | | 12/2015 | Hazle et al. | |
| 2019/0016634 A1 | | 1/2019 | Jantke et al. | |

FOREIGN PATENT DOCUMENTS

| | | |
|---|---|---|
| CN | 1134399 A | 10/1996 |
| CN | 102220036 A | 10/2011 |
| CN | 107922268 A | 4/2018 |
| JP | 2003-17118 A | 6/2003 |
| JP | 3891265 B2 | 3/2007 |
| JP | 2007-191355 A | 8/2007 |
| JP | 2010-085837 A | 4/2010 |
| JP | 2014-136670 A | 7/2014 |

OTHER PUBLICATIONS

Pfaudler Mixing Systems—booklet. (Year: 2007).*
Dec. 15, 2020 Office Action and Search Report issued in Chinese Patent Application No. 201810832794.6.
Mar. 20, 2020 Office Action issued in U.S. Appl. No. 16/033,539.
May 20, 2021 Office Action issued in Chinese Patent Application No. 201810832794.6.
Jun. 28, 2021 Office Action and Search Report issued in Taiwanese Patent Application No. 107123658.
Aug. 25, 2021 Office Action issued in Chinese Patent Application No. 201810832794.6.
Jul. 21, 2020 Office Action issued in Japanese Patent Application No. 2017-149469.
Dec. 20, 2022 Office Action issued in Korean Patent Application No. 2018-0087416.

* cited by examiner

*Primary Examiner* — Hoa (Holly) Le
(74) *Attorney, Agent, or Firm* — Oliff PLC

(57) ABSTRACT

A method for manufacturing granulated silica. The method includes granulating silica powders each having a primary particle size of 5 to 50 nm by use of water, and hydrophobizing each surface of the silica powders with a silicon atom-containing hydrophobizing agent before or simultaneously with the granulation step.

5 Claims, No Drawings

METHOD FOR MANUFACTURING GRANULATED SILICA

This application is a Divisional of application Ser. No. 16/033,539, filed Jul. 12, 2018, which claims priority to Japanese Application No. 2017-149469, filed Aug. 1, 2017. The entire contents of the prior applications are hereby incorporated by reference herein in their entirety.

TECHNICAL FIELD

The present invention relates to granulated silica with increased bulk density in which silica powders are hydrophobized, and a method for manufacturing the same.

BACKGROUND ART

Silica powders that are fine particles having a primary particle size of about 10 nm are ordinarily manufactured by a process referred to as a wet method or a dry method. The wet silica is obtained by the reaction of sodium silicate and sulfuric acid to form silica precipitate, followed by filtration, drying, grinding, and classification thereof. On the other hand, the dry silica is obtained by subjecting tetrachlorosilane in a vapor phase to high-temperature hydrolysis by an oxyhydrogen flame. These silica powders are characterized by having white color and large specific surface area, and are widely used as a reinforcing agent for rubber or plastic, a thickener for paint or adhesive, and an agent for improving the fluidity of various powders. In the actual use thereof, however, the smaller bulk density and easiness of scattering cause problems that the handleability is poor and a larger container is necessary for storing.

Accordingly, as a method for increasing the bulk density to improve the handleability, it has been proposed a hydrophobizing method in which silica powders and a treatment are pre-mixed, and then subjected to compacting in a mill by a medium of ball (see Patent Literature 1). Incidentally, Patent Literature 1 points that use of water at this stage causes increasing of adherence or aggregation of silica. This method allows to increase the bulk density of silica powders to improve the handleability. Additionally, the mixing, pulverizing, and compacting are performed in a mill after pre-mixing with a treatment, thereby improving the storage stability of the mixture. The silica granulated by such a method, however, fails to aggregate to reduce the dispersibility. Accordingly, the resin composition containing this silica has a problem of forming a cured material with a largely reduced total luminous transmittance or haze value (that is, the transparency is reduced).

CITATION LIST

Patent Literature

PATENT LITERATURE 1: Japanese Patent No. 3891265

SUMMARY OF INVENTION

Technical Problem

The present invention was accomplished to solve the above problems. It is an object of the present invention to provide granulated silica with excellent handleability and good dispersibility as well as a method for manufacturing the same.

Solution to Problem

To solve the foregoing problem, the present invention provides granulated silica comprising water-granulated silica powders, each of the silica powders having:
a primary particle size of 5 to 50 nm, and
a surface hydrophobized with a silicon atom-containing hydrophobizing agent;
the granulated silica having a degree of hydrophobization of 40 or more and a loose bulk density of 150 g/L or more.

The granulated silica like this realizes excellent handleability and good dispersibility.

The silica powders are preferably powders of wet silica or dry silica.

These silica powders are particularly favorable for the granulated silica of the present invention.

The silicon atom-containing hydrophobizing agent is preferably at least one member selected from organosilazane compounds, polysilazane compounds, organosilane compounds, and organopolysiloxanes.

The silicon atom-containing hydrophobizing agent like this enables silica particles to have hydrophobized surface securely, and is particularly favorable for the granulated silica of the present invention.

It is preferable that the granulated silica be configured to form a cured material having a total luminous transmittance of 60% or more, the cured material having a thickness of 6 mm and being obtained by curing a resin composition containing the granulated silica.

The granulated silica like this gives a cured material with good transparency when it is added to a resin composition.

It is preferable that the granulated silica be configured to form a cured material having a haze value of 40% or less, the cured material having a thickness of 6 mm and being obtained by curing a resin composition containing the granulated silica.

The granulated silica like this gives a cured material with good transparency when it is added to a resin composition.

The present invention further provides a method for manufacturing granulated silica, comprising:

a granulation step of granulating silica powders each having a primary particle size of 5 to 50 nm by use of water, and hydrophobizing each surface of the silica powders with a silicon atom-containing hydrophobizing agent before or simultaneously with the granulation step.

The method for manufacturing granulated silica like this makes it possible to manufacture granulated silica with excellent handleability and good dispersibility easily and at low cost.

It is preferable to use wet silica or dry silica as the silica powders.

These silica powders are particularly favorable for the method for manufacturing granulated silica of the present invention.

It is preferable that the silicon atom-containing hydrophobizing agent be at least one member selected from organosilazane compounds, polysilazane compounds, organosilane compounds, and organopolysiloxanes.

The silicon atom-containing hydrophobizing agent like this enables silica powders to have hydrophobized surface securely, and is particularly favorable for the method for manufacturing granulated silica of the present invention.

In the granulation step, it is preferable to use an agitating granulator.

The use of an agitating granulator as described above facilitates the water-granulation.

Preferably, the inventive method further comprises a drying step of removing water used for the granulating after the granulation step.

The drying step like this makes it possible to obtain granulated silica which is dried with the water being removed.

Preferably, the inventive method further comprises a heat treatment step of heating the granulated silica at a temperature of 150 to 300° C. after the drying step.

The heat treatment step like this securely makes it possible to hydrophobize the surface of silica powder with a silicon atom-containing hydrophobizing agent.

Advantageous Effects of Invention

As described above, the inventive granulated silica is excellent in handleability and has good dispersibility, thereby allowing the resin composition containing this granulated silica to form a cured material without largely reducing the total luminous transmittance or haze value (that is, the granulated silica gives good transparency). Accordingly, the inventive granulated silica like this is particularly favorable for fillers of a resin composition such as silicone rubber. Additionally, the inventive method for manufacturing granulated silica makes it possible to manufacture the inventive granulated silica described above easily and at low cost.

DESCRIPTION OF EMBODIMENTS

As described above, it has been desired to develop granulated silica with excellent handleability and good dispersibility as well as a method for manufacturing the same.

The present inventors have diligently studied to accomplish the foregoing problems and consequently found that silica powders which has a prescribed degree of hydrophobization and loose bulk density, with the surface being hydrophobized with a silicon atom-containing hydrophobizing agent before or simultaneously with the water-granulation step in water granulation of silica powders having a primary particle size of 5 to 50 nm, makes it possible to improve the handleability, and allows the silica to be dispersed in a resin composition containing the granulated silica to give a cured material without substantially reducing the total luminous transmittance or the haze value; thereby brought the present invention to completion.

That is, the present invention is granulated silica comprising water-granulated silica powders,
each of the silica powders having:
a primary particle size of 5 to 50 nm, and
a surface hydrophobized with a silicon atom-containing hydrophobizing agent;
the granulated silica having a degree of hydrophobization of 40 or more and a loose bulk density of 150 g/L or more.

Hereinafter, the present invention will be described in detail, but the present invention is not limited thereto.

<Granulated Silica>

The granulated silica of the present invention is granulated silica in which silica powders each having a primary particle size of 5 to 50 nm are water-granulated, and the surfaces of the silica powders are hydrophobized with a silicon atom-containing hydrophobizing agent, which granulated silica has a degree of hydrophobization of 40 or more and a loose bulk density of 150 g/L or more.

The silica powder before granulation, which is a raw material for the inventive granulated silica, has a primary particle size of 5 to 50 nm. The silica powder with the primary particle size before granulation being less than 5 nm is not manufactured in large quantities as a reinforcing agent for rubber or plastic, and is not suitable for practical use. The silica powder with the primary particle size before granulation being more than 50 nm is not preferable, although it can be dispersed in a resin uniformly, since the too large primary particle size causes a cured material to have a reduced total luminous transmittance or haze value. The silica powder before granulation preferably has a primary particle size of 5 to 50 nm and a loose bulk density of less than 150 g/L, and particularly preferably has a primary particle size of 5 to 20 nm and a loose bulk density of 20 to 100 g/L. When the silica powder before granulation has a primary particle size and a loose bulk density being in the above ranges, the granulated silica is blended into a resin composition such as silicone rubber to realize excellent reinforcing properties for the cured material. Incidentally, the primary particle size in the present invention refers to a diameter of the particle measured under a transmission electron microscope.

The silica powder before granulation may be any of hydrophilic silica, and is preferably wet silica or dry silica. The wet silica can be manufactured by a precipitation method or a gelation method, for example, and the wet silica manufactured by a precipitation method is preferable since it is easy to be dispersed by shearing due to the bond of secondary particle is soft compared to the one manufactured by a gelation method. Illustrative example of the dry silica includes dry silica manufactured by high-temperature hydrolysis of tetrachlorosilane.

In the granulated silica of the present invention, the surface of silica powder is hydrophobized with a silicon atom-containing hydrophobizing agent. As the silicon atom-containing hydrophobizing agent to hydrophobize the surface of silica powder, it is preferable to use at least one member selected from organosilazane compounds, polysilazane compounds, organosilane compounds, and organopolysiloxanes. As the silicon atom-containing hydrophobizing agent like this, any known one can be used including organosilazane compounds such as hexamethyldisilazane, diphenyltetramethyldisilazane, and divinyltetramethyldisilazane; polysilazane compounds such as perhydropolysilazane and methylhydropolysilazane; organoalkoxysilanes such as methyltrimethoxysilane, methyltriethoxysilane, phenyltrimethoxysilane, dimethyldimethoxysilane, vinyltrimethoxysilane, vinyltriethoxysilane, divinyldimethoxysilane, vinylmethyldimethoxysilane, and vinyltris(methoxyethoxy)silane; organochlorosilanes such as methyltrichlorosilane, phenyltrichlorosilane, and vinyltrichlorosilane; organosilane compounds such as partial hydrolysis products of the organochlorosilanes; and organopolysiloxanes such as a siloxane oligomer with the polymerization degree of 50 or less having a functional group including an Si—OH group or an Si—OR' group (R' represents a monovalent hydrocarbon group) at the terminal of the molecular chain.

The inventive granulated silica has a degree of hydrophobization of 40 or more and a loose bulk density of 150 g/L or more. When the granulated silica has a degree of hydrophobization of less than 40, the insufficient hydrophobization causes agglomeration of the silica, and a resin composition containing the granulated silica forms a cured material with largely reduced total luminous transmittance or haze value. When the granulated silica has a loose bulk density less than 150 g/L, the granulation is insufficient, thereby making the handleability worse. Incidentally, the degree of hydrophobization and the loose bulk density in the present invention refer the ones measured under the following conditions.

<Method for Measuring Degree of Hydrophobization (Methanol Titrimetric Method)>

A 200 mL beaker is charged with 50 mL of pure water, 0.2 g of a sample is added thereto, and the contents are stirred with a magnet stirrer. With the distal end of a buret filled with methanol being introduced in the liquid and with stirring, methanol is added dropwise to measure the amount of added methanol to disperse the sample into the water completely. The degree of hydrophobization is obtained according to the following equation when the amount of added methanol is expressed as Y mL:

the degree of hydrophobization=$\{Y/(50+Y)\}\times 100$

<Method for Measuring Loose Bulk Density>

The tester used is Multi Tester MT-1000 manufactured by SEISHINENTERPRISE CO., LTD. At the top of the feeder unit, a funnel, a sieve (opening diameter: 150 μm), and a spacer for a sieve are stacked in this order and are fixed with a stopper. On the sample stand, a 100 mL cell is set. With a sample being introduced into the sample unit, the feeder is vibrated whereby the sample falls down from the sieve to fill up the cell. The sample fill is leveled off with a leveling blade. The loose bulk density ρ (g/L) is obtained by the following equation:

$\rho=\{(W1-W0)/100\}\times 1000$, wherein W0 represents the weight of the cell container (g), and W1 represents the weight of the cell container and the sample (g).

The inventive granulated silica is preferably characterized such that the cured material with the thickness of 6 mm obtained by curing a resin composition containing this granulated silica has a total luminous transmittance of 60% or more. The granulated silica like this is added to a resin composition to give a cured material with good transparency.

Herein, the total luminous transmittance is an indication of measuring the transparency of a cured rubber containing the inventive granulated silica, and refers to a value measured for a silicone rubber sheet with the thickness of 6 mm in accordance with the method described in JIS K 7361-1: 1997 "Plastics—Determination of the total luminous transmittance of transparent materials".

The inventive granulated silica is preferably characterized such that the cured material with the thickness of 6 mm obtained by curing a resin composition containing this granulated silica has a haze value of 40% or less. The granulated silica like this is added to a resin composition to give a cured material with good transparency.

Herein, the haze value is an indication of measuring the dispersibility of the inventive granulated silica into a rubber compound, and refers to a value measured for a silicone rubber sheet with the thickness of 6 mm containing the inventive granulated silica in accordance with the method described in JIS K 7136: 2000 "Plastics—Determination of haze for transparent materials".

As described above, the inventive granulated silica is excellent in handleability and has good dispersibility, thereby allowing the resin composition containing this granulated silica to form a cured material without largely reducing the total luminous transmittance or haze value (that is, the granulated silica gives good transparency). Accordingly, the inventive granulated silica like this is particularly favorable for fillers of a resin composition such as silicone rubber.

<Method for Manufacturing Granulated Silica>

The present invention also provides a method for manufacturing granulated silica, comprising:

a granulation step of granulating silica powders each having a primary particle size of 5 to 50 nm by use of water, and hydrophobizing each surface of the silica powders with a silicon atom-containing hydrophobizing agent before or simultaneously with the granulation step.

Usually, water agglomerates silica powders, thereby reducing the dispersibility of the silica powders in a resin composition to worsen the total luminous transmittance or the haze value of the cured material of a resin composition containing the silica. Accordingly, it is unusual to use water as a granulation medium in a use for dispersing silica into a resin composition uniformly. On the other hand, water is a medium easy to handle for granulation and drying in an industrial level unlike organic solvents, which largely effects to the cost in selecting devices or treating the granulated materials.

Accordingly, in the inventive method for manufacturing granulated silica, the surface of silica powder is hydrophobized with a silicon atom-containing hydrophobizing agent, thereby allowing the silica powders to be granulated by using water while preventing the silica powders from excess aggregation due to water. This makes it possible to manufacture granulated silica that is excellent in handleability and has favorable dispersibility easily at low cost.

In the granulation step of granulating silica powders with water, the use of an agitating granulator is preferable. Illustrative examples of the usable agitating granulator include batch apparatuses such as a Henschel mixer, EIRICH mixer, and a high-speed mixer; and continuous apparatuses such as a horizontal axis blade. With these apparatus, it is possible to disperse water to silica powders uniformly by supplying water with a spray while the silica powders are stirred and mixed at high speed to give granulated silica in an appropriate ratio of silica powders and water, together with appropriate stirring intensity and stirring time.

In the method for manufacturing granulated silica of the present invention, the surface of silica powder is hydrophobized with a silicon atom-containing hydrophobizing agent before or simultaneously with the granulation step.

When the surface of silica powder is hydrophobized before the granulation step, the surface of silica powder can be hydrophobized by previously mixing the silica powders and a silicon atom-containing hydrophobizing agent by an appropriate method before introducing the silica powders into a granulation apparatus such as the agitation granulator. The granulation can be performed after hydrophobizing the surface of silica powder by introducing the silica powders into a granulation apparatus, followed by spraying a silicon atom-containing hydrophobizing agent with a spray of the granulation apparatus.

When the surface of silica powder is hydrophobized simultaneously with the granulation step, it is possible to perform hydrophobizing of the surface of silica powder and water-granulation simultaneously by introducing the silica powders into a granulation apparatus such as the agitation granulator, followed by spraying a mixture of a silicon atom-containing hydrophobizing agent and water with a spray of the granulation apparatus.

The method for preparing the mixture of a hydrophobizing agent and water used at this stage can be appropriately selected in accordance with the kind of the hydrophobizing agent. When the hydrophobizing agent has favorable compatibility with water, it can be mixed by simple mixing. When the hydrophobizing agent has poor compatibility with water, it can be dispersed homogeneously with a mixing apparatus such as a homogenizer to prepare the mixture. As a method other than the mechanical homogenization, the hydrophobizing agent and water can be mixed by adding appropriate amount of organic solvent such as alcohols to make the hydrophobizing agent and water compatible.

The appropriate ratio of silica powders and water for obtaining the granulated silica can be appropriately selected in accordance with the kind and amount of the hydrophobizing agent. The mass ratio of water to the silica powders is preferably set to 0.6 to 5, more preferably 1 to 3 of water with respect to 1 of the silica powders.

Incidentally, the silica powder having a primary particle size of 5 to 50 nm, which is a raw material of the granulated silica, and the silicon atom-containing hydrophobizing agent to hydrophobize the surface of the silica powders may include ones that are enumerated in the explanation of the granulated silica described above.

The inventive method for manufacturing granulated silica preferably has a drying step of removing water used for the granulating subsequent to the granulation step. Illustrative examples of the apparatus used for the drying step include a continuous hot-air dryer, a batch type dryer, a material transfer dryer, a material agitation dryer, a hot air transfer dryer, and a vacuum dryer. Any dryer may be used, but excess force applied at the stage with higher water content has a risk of causing pasting of the granulated silica. Even when pasting is not caused, there occurs a risk of causing coarse grains. Accordingly, it is preferable to select a mechanism by which excess force is not applied to granulated silica. In the drying process, the granulated silica contains a hydrophobizing agent, and is preferably dried under a condition of lacking oxygen, specifically in an inert atmosphere such as nitrogen in order to prevent decomposition of the hydrophobizing agent. However, it is also possible to use hot air to remove water for drying at a relatively lower temperature in view of economical reasons.

The drying step is preferably followed by a heat treatment step of heating the granulated silica at a temperature of 150 to 300° C. As an apparatus used in the heat treatment step, it is possible to use the same apparatus used in the drying step. The heat treatment is performed at a temperature of 150 to 300° C., the reaction time of which is required to be about 4 hours at most, and accordingly, it is preferable to perform the reaction under a condition of lacking oxygen, specifically in an inert atmosphere such as nitrogen in order to prevent decomposition of the hydrophobizing agent.

As described above, the inventive method for manufacturing granulated silica makes it possible to manufacture granulated silica that is excellent in handleability and has good dispersibility easily and at low cost.

EXAMPLES

Hereinafter, the present invention will be described specifically by showing Examples and Comparative Examples, but the present invention is not limited thereto. Incidentally, the average polymerization degree in Examples means a weight average molecular weight measured by gel permeation chromatography (GPC) in terms of polystyrene.

<Method for Measuring Loose Bulk Density>

The tester used was Multi Tester MT-1000 manufactured by SEISHINENTERPRISE CO., LTD. At the top of the feeder unit, a funnel, a sieve (opening diameter: 150 μm), and a spacer for a sieve were stacked in this order and were fixed with a stopper. On the sample stand, a 100 mL cell was set. With a sample being introduced into the sample unit, the feeder was vibrated, whereby the sample fell down from the sieve to fill up the cell. The sample fill was leveled off with a leveling blade. The loose bulk density ρ (g/L) is obtained by the following equation:

$$\rho = \{(W1-W0)/100\} \times 1000,$$

wherein W0 represents the weight of the cell container (g), and W1 represents the weight of the cell container and the sample (g).

<Method for Measuring Degree of Hydrophobization (Methanol Titrimetric Method)>

A 200 mL beaker was charged with 50 mL of pure water, 0.2 g of a sample was added thereto, and the contents were stirred with a magnet stirrer. With the distal end of a buret filled with methanol being introduced in the liquid and with stirring, methanol was added dropwise to measure the amount of added methanol to disperse the sample into the water completely. The degree of hydrophobization is obtained according to the following equation when the amount of added methanol is expressed as Y mL:

$$\text{the degree of hydrophobization} = \{Y/(50+Y)\} \times 100$$

<Method for Measuring Total Luminous Transmittance and Haze Value>

Into a 100 parts by mass of silicone rubber compound, 0.5 parts by mass of C-25A and 2.0 parts by mass of C-25B (both manufactured by Shin-Etsu Chemical Co., Ltd.) were mixed homogeneously as curing agents for addition reaction type rubber. This was subjected to press curing at 120° C. for 10 minutes to produce a rubber sheet with the thickness of 6 mm. The total luminous transmittance and the haze value were measured for the rubber sheet with Haze Computer HGM-2 of direct reading type (made by Suga Test Instruments Co., Ltd.) to evaluate the dispersibility of the granulated silica.

Example 1

(Manufacture of Granulated Silica)

The following procedure was performed on fumed silica with the primary particle size of 10 nm and the loose bulk density of 45 g/L obtained by high-temperature hydrolysis of silane. A high-speed mixer (capacity: 10 L) was charged with 200 g of the fumed silica, and was operated at a rotation rate of 1,500 rpm. After the rotation had become stable, 75 g of hydrolysis product of dimethyldimethoxysilane was sprayed for 20 seconds as a hydrophobizing agent, followed by spraying 300 g of pure water for 60 seconds. The obtained wet granulated material had a loose bulk density of 362 g/L. Then, the obtained wet granulated material was dried to remove the water in a dryer to give dried granulated material having a loose bulk density of 198 g/L. Subsequently, 100 g of this dried granulated material was charged into a 2 L flask, and heated at 250° C. for 2.5 hours. The obtained Granulated silica-1 had a loose bulk density of 186 g/L and a degree of hydrophobization of 55 according to the methanol titrimetric method.

(Preparation of Resin Composition)

In a 100 cc Labo Plastomill, 60 g of organopolysiloxane with the average polymerization degree of about 6,000 and 26 g of Granulated silica-1 were mixed to prepare Rubber compound-1. In this case, the granulated silica was introduced in four installments after introducing the organopolysiloxane, and the organopolysiloxane and the silica were incorporated in total 4 minutes. In the mixing, the temperature was set to 50° C., and the mixing time was set to 30 minutes. The total luminous transmittance and the haze value were measured for Rubber sheet-1 (cured material), which was produced from prepared Rubber compound-1, by the measuring method described above. The results are shown in Table 1.

Example 2

(Manufacture of Granulated Silica)

The same procedure as in Example 1 was performed on fumed silica with the primary particle size of 50 nm and the loose bulk density of 50 g/L obtained by high-temperature hydrolysis of silane. The obtained wet granulated material had a loose bulk density of 450 g/L. Then, the obtained wet granulated material was dried to remove the water in a dryer to give dried granulated material having a loose bulk density of 280 g/L. Subsequently, 100 g of this dried granulated material was charged into a 2 L flask, and heated at 250° C. for 2.5 hours. The obtained Granulated silica-2 had a loose bulk density of 260 g/L and a degree of hydrophobization of 52 according to the methanol titrimetric method.

(Preparation of Resin Composition)

Rubber compound-2 was prepared in the same way as in Example 1 except for using Granulated silica-2 instead of Granulated silica-1. The total luminous transmittance and the haze value were measured for Rubber sheet-2 (cured material), which was produced from prepared Rubber compound-2. The results are shown in Table 1.

Example 3

(Manufacture of Granulated Silica)

The same procedure as in Example 1 was performed on wet silica with the primary particle size of 20 nm and the loose bulk density of 126 g/L obtained by a wet precipitation method. The obtained wet granulated material had a loose bulk density of 416 g/L. Then, the obtained wet granulated material was dried to remove the water in a dryer to give dried granulated material having a loose bulk density of 203 g/L. Subsequently, 100 g of this dried granulated material was charged into a 2 L flask, and heated at 250° C. for 2.5 hours. The obtained Granulated silica-3 had a loose bulk density of 200 g/L and a degree of hydrophobization of 57 according to the methanol titrimetric method.

(Preparation of Resin Composition)

Rubber compound-3 was prepared in the same way as in Example 1 except for using Granulated silica-3 instead of Granulated silica-1. The total luminous transmittance and the haze value were measured for Rubber sheet-3 (cured material), which was produced from prepared Rubber compound-3. The results are shown in Table 1.

Example 4

(Manufacture of Granulated Silica)

A high-speed mixer (capacity: 10 L) was charged with 200 g of the same fumed silica as in Example 1, and was operated at a rotation rate of 1,500 rpm. After the rotation had become stable, 25 g of linear dimethylsiloxane oligomer the terminal of which was blocked by a silanol group (polymerization degree: about 30) was sprayed for 10 seconds as a hydrophobizing agent, followed by spraying 300 g of pure water for 60 seconds. Then, this was subjected to heat treatment under the same conditions as in Example 1. The obtained Granulated silica-4 had a loose bulk density of 190 g/L and a degree of hydrophobization of 65 according to the methanol titrimetric method.

(Preparation of Resin Composition)

Rubber compound-4 was prepared in the same way as in Example 1 except for using Granulated silica-4 instead of Granulated silica-1. The total luminous transmittance and the haze value were measured for Rubber sheet-4 (cured material), which was produced from prepared Rubber compound-4. The results are shown in Table 1.

Example 5

(Manufacture of Granulated Silica)

Dried granulated material was produced under the same conditions as in Example 1. Subsequently, 100 g of this dried granulated material was charged into a 2 L flask, and heated at 150° C. for 2.5 hours. The obtained Granulated silica-5 had a loose bulk density of 180 g/L and a degree of hydrophobization of 40 according to the methanol titrimetric method.

(Preparation of Resin Composition)

Rubber compound-5 was prepared in the same way as in Example 1 except for using Granulated silica-5 instead of Granulated silica-1. The total luminous transmittance and the haze value were measured for Rubber sheet-5 (cured material), which was produced from prepared Rubber compound-5. The results are shown in Table 1.

Example 6

(Manufacture of Granulated Silica)

Wet granulated material was produced under the same conditions as in Example 1. Subsequently, 160 g of this wet granulated material was charged into a 200φ×330 L rotary kiln. The temperature of the rotary kiln was set to 280° C. to increase the bulk temperature to 240° C., which had been kept for 2.5 hours thereafter. The obtained Granulated silica-6 had a loose bulk density of 150 g/L and a degree of hydrophobization of 53 according to the methanol titrimetric method.

(Preparation of Resin Composition)

Rubber compound-6 was prepared in the same way as in Example 1 except for using Granulated silica-6 instead of Granulated silica-1. In this case, the granulated silica was introduced in four installments after introducing the organopolysiloxane, and the organopolysiloxane and the silica were incorporated in total 5 minutes. In the mixing, the temperature was set to 50° C., and the mixing time was set to 30 minutes. The total luminous transmittance and the haze value were measured for Rubber sheet-6 (cured material), which was produced from prepared Rubber compound-6. The results are shown in Table 1.

Comparative Example 1

(Manufacture of Granulated Silica)

A high-speed mixer (capacity: 10 L) was charged with 200 g of the same fumed silica as in Example 1, and was operated at a rotation rate of 1,500 rpm. After the rotation had become stable, 400 g of pure water was sprayed for 80 seconds without spraying a hydrophobizing agent. The obtained wet granulated material had a loose bulk density of 400 g/L. Then, the obtained wet granulated material was dried to remove the water in a dryer to give dried granulated material (Comparative granulated silica) having a loose bulk density of 185 g/L. This Comparative granulated silica was not hydrophobized, and was dissolved in water thereby (i.e., the degree of hydrophobization was 0).

(Preparation of Resin Composition)

In a 100 cc Labo Plastomill, 60 g of organopolysiloxane with the average polymerization degree of about 6,000, 24 g of Comparative granulated silica, and 10 g of hydrolysis product of dimethyldimethoxysilane, which was added as a hydrophobizing agent in Example 1, were mixed to prepare Rubber compound-1'. In the mixing, the temperature was set to 50° C., and the mixing time was set to 30 minutes. The total luminous transmittance and the haze value were measured for the Rubber sheet-1' (cured material), which was produced from prepared Rubber compound-1', in the same way as in Example 1. The results are shown in Table 1.

Comparative Example 2

(Manufacture of Granulated Silica)

The same procedure as in Example 1 was performed on fumed silica with the primary particle size of 60 nm and the loose bulk density of 55 g/L obtained by high-temperature hydrolysis of silane. The obtained wet granulated material had a loose bulk density of 500 g/L. Then, the obtained wet granulated material was dried to remove the water in a dryer to give dried granulated material having a loose bulk density of 320 g/L. Subsequently, 100 g of this dried granulated material was charged into a 2 L flask, and heated at 250° C. for 2.5 hours. The obtained Granulated silica-2' had a loose bulk density of 300 g/L and a degree of hydrophobization of 45 according to the methanol titrimetric method.

(Preparation of Resin Composition)

Rubber compound-2' was prepared in the same way as in Example 1 except for using Granulated silica-2' instead of Granulated silica-1. The total luminous transmittance and the haze value were measured for the Rubber sheet-2' (cured material), which was produced from prepared Rubber compound-2'. The results are shown in Table 1.

Comparative Example 3

(Manufacture of Granulated Silica)

Dried granulated material was produced under the same conditions as in Example 1. Subsequently, 100 g of this dried granulated material was charged into a 2 L flask, and heated at 135° C. for 2.5 hours. The obtained Granulated silica-3' had a loose bulk density of 190 g/L and a degree of hydrophobization of 35 according to the methanol titrimetric method.

(Preparation of Resin Composition)

Rubber compound-3' was prepared in the same way as in Example 1 except for using Granulated silica-3' instead of Granulated silica-1. The total luminous transmittance and the haze value were measured for the Rubber sheet-3' (cured material), which was produced from prepared Rubber compound-3'. The results are shown in Table 1.

Comparative Example 4

(Manufacture of Granulated Silica)

A high-speed mixer (capacity: 10 L) was charged with 200 g of the same fumed silica as in Example 1, and was operated at a rotation rate of 1,500 rpm. After the rotation had become stable, 75 g of hydrolysis product of dimethyldimethoxysilane was sprayed for 20 seconds as a hydrophobizing agent, followed by spraying 100 g of pure water for 60 seconds. Then, this was subjected to heat treatment under the same conditions as in Example 1. The obtained Granulated silica-4' had a loose bulk density of 100 g/L and a degree of hydrophobization of 55 according to the methanol titrimetric method.

(Preparation of Resin Composition)

Rubber compound-4' was prepared in the same way as in Example 1 except for using Granulated silica-4' instead of Granulated silica-1. In this case, the granulated silica was introduced in eight installments after introducing the organopolysiloxane, and the organopolysiloxane and the silica were incorporated in total 10 minutes. Compared to the case using granulated silica with the loose bulk density of 150 g/L or more, the number of installments was increased, and the time for mixing was extended. In the mixing, the temperature was set to 50° C., and the mixing time was set to 30 minutes. The total luminous transmittance and the haze value were measured for the Rubber sheet-4' (cured material), which was produced from prepared Rubber compound-4'. The results are shown in Table 1.

Comparative Example 5

(Comparative Silica)

As Comparative silica, 200 g of the same fumed silica as in the Example 1 was used without granulation.

(Preparation of Resin Composition)

In a 100 cc Labo Plastomill, 60 g of organopolysiloxane with the average polymerization degree of about 6,000, 24 g of Comparative silica, and 10 g of hydrolysis product of dimethyldimethoxysilane, which was added as a hydrophobizing agent in Example 1, were mixed to prepare Rubber compound-5'. In this case, the silica was introduced little by little after introducing the organopolysiloxane, and the organopolysiloxane and the silica were incorporated in total 20 minutes. Compared to the case using granulated silica with the loose bulk density of 150 g/L or more, the number of installments and the time for mixing were both largely increased. In the mixing, the temperature was set to 50° C., and the mixing time was set to 30 minutes. The total luminous transmittance and the haze value were measured for the Rubber sheet-5' (cured material), which was produced from prepared Rubber compound-5', in the same way as in Example 1. The results are shown in Table 1.

TABLE 1

| | Granulated silica/Comparative granulated silica | | | Properties of curd material | |
|---|---|---|---|---|---|
| | Primary particle size (nm) | Degree of hydro-phobization | Loose bulk density (g/L) | Total luminous transmittance (%) | Haze value (%) |
| Example 1 | 10 | 55 | 186 | 65 | 36 |
| Example 2 | 50 | 52 | 260 | 60 | 40 |
| Example 3 | 20 | 57 | 200 | 61 | 39 |
| Example 4 | 10 | 65 | 190 | 63 | 38 |
| Example 5 | 10 | 40 | 180 | 65 | 38 |
| Example 6 | 10 | 53 | 150 | 65 | 35 |
| Comparative Example 1 | 10 | 0 | 185 | 51 | 93 |
| Comparative Example 2 | 60 | 45 | 300 | 55 | 60 |
| Comparative Example 3 | 10 | 35 | 190 | 65 | 50 |
| Comparative Example 4 | 10 | 55 | 100 | 64 | 37 |
| Comparative Example 5 | — | — | — | 65 | 37 |

As shown in Table 1, using Granulated silica 1 to 6, in which silica powders were water-granulated with the surface being hydrophobized with a silicon atom-containing hydrophobizing agent, Example 1 to 6 gave glanulated silica that was excellent in handleability. The dispersibility was also favorable as can be seen from the total luminous transmittance and the haze value that were not reduced largely in each of the cured materials of the resin compositions containing these granulated silica having a thickness of 6 mm.

On the other hand, using Comparative granulated silica, in which silica powders were water-granulated without hydrophobizing the surface with a silicon atom-containing hydrophobizing agent, Comparative Example 1 gave granulated silica with excellent handleability, but showed insufficient dispersibility as can be seen from the total luminous transmittance and the haze value that were largely reduced in the cured material of the resin composition containing this Comparative granulated silica having a thickness of 6 mm. In Comparative Example 2, using silica powders with the primary particle size of more than 50 nm, granulated silica with excellent handleability was obtained, but the dispersibility was poor. In Comparative Example 3, using granulated silica with the degree of hydrophobization of less than 40, granulated silica with excellent handleability was obtained, but the dispersibility was poor. In Comparative Example 4, using granulated silica with the loose bulk density of less than 150 g/L, the handleability was poor as can be seen from the time of mixing the granulated silica in Labo Plastomill that was more than twice of those in Examples. In Comparative Example 5 (blank), using silica without being granulated, the handleability was poor since the silica was not granulated, which can be seen from the time of mixing the silica in Labo Plastomill that was more than four times of those in Examples.

From the above, it was revealed that the present invention is able to provide granulated silica that is excellent in handleability and has good dispersibility.

It is to be noted that the present invention is not restricted to the foregoing embodiment. The embodiment is just an exemplification, and any examples that have substantially the same feature and demonstrate the same functions and effects as those in the technical concept described in claims of the present invention are included in the technical scope of the present invention.

The invention claimed is:

1. A method for manufacturing granulated silica, comprising:
    a granulation step of granulating silica powders each having a primary particle size of 5 to 50 nm by use of water, where a mass ratio of the water to the silica powders being set to 0.6 to 5 of water with respect to 1 of the silica powders,
    a drying step of removing water used for the granulating after the granulation step,
    a heat treatment step of heating the granulated silica at a temperature of 150 to 300° C. after the drying step, and
    hydrophobizing each surface of the silica powders with a silicon atom-containing hydrophobizing agent before or simultaneously with the granulation step.

2. The method for manufacturing granulated silica according to claim 1, wherein the silicon atom-containing hydrophobizing agent is at least one member selected from organosilazane compounds, polysilazane compounds, organosilane compounds, and organopolysiloxanes.

3. The method for manufacturing granulated silica according to claim 1, wherein the silica powders are powders of wet silica or dry silica.

4. The method for manufacturing granulated silica according to claim 3, wherein the silicon atom-containing hydrophobizing agent is at least one member selected from organosilazane compounds, polysilazane compounds, organosilane compounds, and organopolysiloxanes.

5. The method for manufacturing granulated silica according to claim 1, wherein the granulation step is performed by use of an agitating granulator.

* * * * *